United States Patent [19]
Szegedi et al.

[11] Patent Number: 5,398,046
[45] Date of Patent: Mar. 14, 1995

[54] FACEPLATE FOR AN INTERACTIVE DISPLAY TERMINAL

[75] Inventors: Nicholas J. Szegedi; Eric R. Eustis, both of Simi Valley, Calif.

[73] Assignee: Litton Systems, Inc., Beverly Hills, Calif.

[21] Appl. No.: 130,241

[22] Filed: Oct. 1, 1993

[51] Int. Cl.$^6$ ............................................. G09G 3/00
[52] U.S. Cl. ..................... 345/174; 361/818; 348/820; 174/35 R
[58] Field of Search ............... 348/818, 819, 820; 174/35 R, 35 MS, 35 C; 361/816, 818; 340/815.42, 815.5, 815.59; 345/173, 32, 174, 175, 179; 178/18, 19

[56] References Cited

U.S. PATENT DOCUMENTS

| | | | |
|---|---|---|---|
| 4,055,726 | 10/1977 | Turner et al. | 178/19 |
| 4,349,817 | 9/1982 | Hoffman et al. | 340/815.31 |
| 4,468,702 | 8/1984 | Jandrell | 174/35 R |
| 4,760,456 | 7/1988 | Liang | 348/820 |
| 4,788,597 | 11/1988 | Gart et al. | 348/819 |
| 4,856,101 | 8/1989 | Jonsson et al. | 348/819 |
| 4,872,000 | 10/1989 | Kano et al. | 340/815.42 |
| 5,283,558 | 2/1994 | Chan | 178/18 |

*Primary Examiner*—Richard Hjerpe
*Assistant Examiner*—Lao Lun-Yz
*Attorney, Agent, or Firm*—Donald J. Ellingsberg

[57] ABSTRACT

A faceplate assembly has an electrically conductive grid, which is electrically connected to a suitable ground potential, positioned on or above a display screen of an interactive display terminal (IDT) where the grid has a plurality of optical pipes with metal walls, which provide electromagnetic interference (EMI) protection, and with optical cores, which enhance visibility, that optically pipe information originally displayed on the IDT screen which is piped to a viewing plane developed by the grid. A continuous, serpentine electrical conductor is carried by and positioned over the optical pipe walls by a flexible, transparent overlay sheet that can be flexed to bring a selected portion of the electrical conductor into an electrical switch closed position with an adjacent optical pipe wall(s). This selected grid position is electrically measurable and thereby determined.

15 Claims, 1 Drawing Sheet

FACEPLATE FOR AN INTERACTIVE DISPLAY TERMINAL

BACKGROUND OF THE INVENTION

1. Field of the Invention

A faceplate for an interactive display terminal (IDT), which displays alphanumeric and graphical information, where the faceplate includes either electromagnetic interference (EMI) shielding, or EMI shielding with a touch electrical switch.

2. Description of Related Art

Any one of a variety of PRIOR ART interactive display terminals (IDTs), which is considered to be a generic term, display alphanumeric and graphical information, including still and moving frames of information. These IDTs include portable calculators, computers, certain televisions, and the like. Using a fixed or portable IDT, an operator can interact with visible information on the display screen or surface. This information can be visually displayed using either light emitting diodes (LED), or liquid crystal displays (LCD), or the like. These IDTs can have self-contained computer software programs, microprocessor capability, or their evolutionary counterparts. They have the system capability to compose, edit, display, receive and send, store, and otherwise process information and communications.

The capability of a state-of-the-art interactive display terminals, such as a Digital Communications Terminal (DCT) available from the Data Systems Division of Litton Systems, Inc., Agoura Hills, Calif., to receive and transmit multiple messages over wireless nets with operator alerting and automatic storage of specified messages is American technology at its best. These messages may be in fixed or variable format, and may be received or transmitted. Interaction with the operator is by means of a display with a transparent, multi-position switch entry overlay. Using a direct readout mechanization, the function of an individual switch can be defined and refined by the operator through a menu selection using available and selected program controls. The operator can compose from a full alphanumeric keyboard, and augment this capability through use of a varied menu or format selection to have direct graphic capability with touch or cursor selection and entry.

Although controllable display brightness and artificial light or sun screens enhance the operation of these PRIOR ART IDTs, there is a continuing requirement to improve operator visibility without glare regardless of the ambient light conditions. There is also a continuing requirement to improve the operator-machine interface, and a requirement to more effectively provide EMI shielding.

OBJECTS OF THE INVENTION

Accordingly, it is an object of the invention to provide a new and improved faceplate for a PRIOR ART IDT which enhances operator visibility without glare regardless of ambient light conditions.

It is an object of the invention to provide a faceplate for a PRIOR ART IDT which has EMI shielding.

It is an object of the invention to provide a faceplate for a PRIOR ART IDT which has a touch electrical switch for better operator-machine interface.

SUMMARY OF THE INVENTION

Briefly, in accordance with one form of the invention, a faceplate assembly has an electrically conductive grid, which is electrically connected to a suitable ground potential, positioned on or above a display screen of an IDT where the grid has a plurality of optical pipes with metal walls, which provide EMI protection, and with optical cores, which enhance visibility, that optically pipe information originally displayed on the screen to a viewing plane developed by the grid. A continuous, serpentine electrical conductor is carried by and positioned over the optical pipe walls by a flexible, transparent overlay sheet that can be flexed to bring a selected portion of the electrical conductor into an electrical switch closed position with an adjacent optical pipe wall(s) where the position is electrically measurable.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawings(s).

DESCRIPTION OF THE PREFERRED EMBODIMENT

Figure 1:
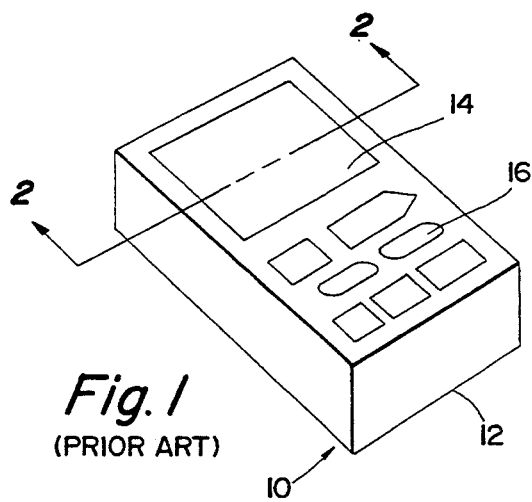
FIG. 1 is a perspective of a generic PRIOR ART interactive display terminal (IDT).

A PRIOR ART generic and portable interactive display terminal (IDT) 10 is shown by FIG. 1. The IDT 10 is representative of those portable devices which are relatively light weight, self contained, and therefore easily and readily portable. Usually an operator can hold the IDT 10 in one hand and operate the IDT using the other free hand. For example, the operator can thus: turn the IDT on-off; adjust the level of brightness of the IDT display screen or surface; position a cursor (when available) on the screen; call-up a desired menu from a resident or separate and external data base for operator review or study; and, otherwise interact with the menu or other displayed information visible on the display screen by contacting the screen surface either with a finger tip or with a mechanical pointer. This representative PRIOR ART IDT 10 has a sturdy, shock resistant case 12 which houses a complement of electronics and computer capabilities that output, in part, to a lighted display screen or surface 14. The various IDT control functions are available to an operator in the form of various key pads 16. These key pads can be formed with the same or different geometric shapes as may be ergonomically desired.

Figure 2:
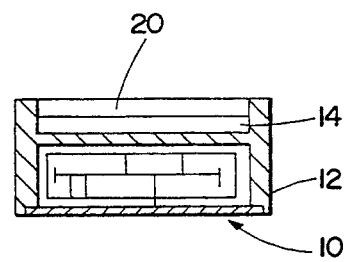
FIG. 2 is a cross section of the IDT of FIG. 1 along the line 2—2 where the PRIOR ART IDT has the electromagnetic interference (EMI) faceplate assembly of the invention.

In FIG. 2, an electromagnetic interference (EMI) faceplate assembly 20 formed in accordance with the invention is positioned on the display screen or surface 14 of the PRIOR ART IDT 10. The EMI assembly 20 can be either permanently or removably fastened to the IDT.

Figure 4:
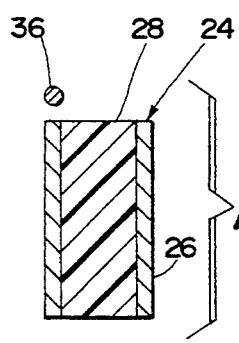
FIG. 4 is a cross section of one of the optical pipes of the EMI assembly of FIGS. 2 and 3, and the spaced-apart relationship in schematic of the pipe and an electrical conductor of the EMI assembly.
Figure 3:
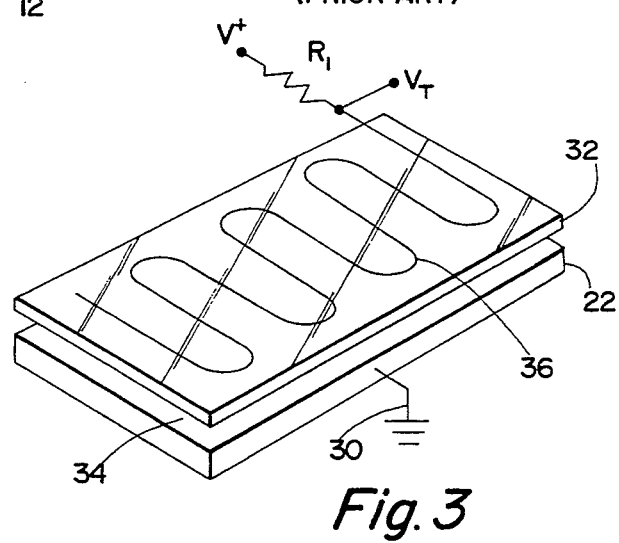
FIG. 3 is a perspective schematic of the EMI assembly of the invention.

Referring now to FIGS. 3 and 4, the EMI faceplate assembly 20 has a "honeycomb" grid 22 formed from a plurality of similar hexagonal EMI optical pipes, such as optical pipe 24 of FIG. 4, which extend outwardly from the IDT display surface 14 and divide the display surface into discrete elements. That is, each EMI optical pipe defines and is associated with a discrete and selectively illuminated element or pixel of the display surface. Each optical pipe 24 has an outer casing or wall 26 as shown by FIG. 4 that is formed from a suitable metal which is a good electrical conductor. Each optical pipe 24 contains a transparent optical medium, such as an optically clear plastic, that forms an optical core 28 which is encased by the outer casing 26. This encased optical core is the functional equivalent of a fiber optic conductor, and enhances the transmission of visible light originating from an associated, illuminated pixel in the IDT display 14. The encased optical pipe 24 channels the light in accordance with the known light pipe effect somewhat like the light enhancement principle of image intensifiers in PRIOR ART night vision devices. It is contemplated and should be understood that other frequencies in the electromagnetic spectrum, in addition to visible light, could also be transmitted through these optical pipes 24 of the grid 22.

Figure 5:
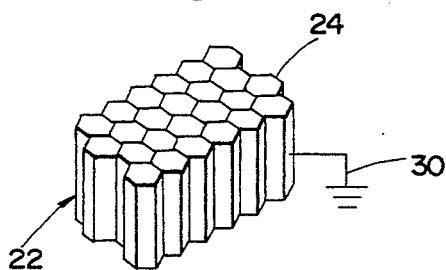
FIG. 5 is a perspective view, partly broken away, of a honeycomb cluster of similar optical pipes like the optical pipe of FIG. 4.

In FIG. 5, similar optical pipes 24 are clustered in the honeycomb grid 22 of the EMI faceplate assembly 20 with the outer wall 26 of each individual pipe in electrical and mechanical contact with the similar outer casing or wall 26 of each adjacent optical pipe. The resulting electrical continuity between the outer casings or walls 26 which form the grid 22 function as a single electrical conductor that is connected to an electrical ground potential 30. In accordance with known EMI principles, when an optical pipe 24 as shown by FIG. 4 has an outer wall 26 that is formed from an electrically conductive material or metal, it will act as a waveguide that will attenuate all frequencies below a cutoff frequency. Attenuation (A), which is measured in decibels (dB), is proportional to the ratio of height (H) to diameter (D) of the optical pipe 24. Each frequency has a known attenuation value measured in dB. For example, a selected frequency has an attenuation of 31.95 dB. Then where the optical pipe has H=3 units and D=1 unit, the attenuation for the selected frequency can be calculated as follows:

$$A = 31.95 \, H/D \text{ dB}$$

$$A = 31.95 \, 3/1 \text{ dB}$$

$$A = 95.85 \text{ dB}$$

When using this equation to design an effective EMI shield for a particular optical pipe geometry that is usable with an interactive display terminal such as PRIOR ART IDT 10, consideration is required of at least the following factors:

1. The illuminated pixel pitch and size for a particular IDT display.
2. The frequency range which is to be attenuated.
3. The required dB attenuation.

FIGS. 2 and 3 also show that the honeycomb grid 22 has longitudinally extending and parallel spaced-apart outer surfaces which are relatively flat; thus, grid 22 has parallel and spaced apart plano-plano surfaces. Such a grid is particularly well suited for positioning on the flat display 14 of an IDT 10 as shown by FIGS. 1 and 2. It is contemplated, however, that the honeycomb grid 22 can have a nonplanar or curved outer surface, or surfaces, as may be required.

Referring now to FIG. 3, EMI assembly 20 has a flexible and transparent layer 32. Reiterating, an operator of the PRIOR ART IDT 10 either is prompted by information (alphanumeric or graphic) displayed by screen 14, or chooses to select or otherwise interact with an information display or prompt. The operator touches the flexible sheet 32 either with a finger tip or with a separate pointer at a selected screen position. In the PRIOR ART IDT, a quadrilateral grid formed from suitable electrical conductors is positioned in an X- and Y-grid with one axis of electrical conductors above and spaced-apart from the other axis of electrical conductors. For example, one or more of the X-axis conductors will flex into a closed electrical switch position with the associated Y-axis conductors under an applied and deflecting force as applied by an operator. This generates a signal which represents the location or grid coordinates where the contact was made. In the EMI assembly 20 of the invention, the flexible sheet 32 is located adjacent to the plano-outer surface 34 of the EMI assembly. However, unlike the PRIOR ART quadrilateral grid, the flexible sheet 32 has a continuous electrical conductor 36 that is positioned on the reverse side of the sheet along the longitudinally extending plane as defined by the flexible sheet.

Referring now to FIG. 3, the continuous and generally serpentine electrical conductor 36 is carried by the flexible and transparent sheet 32. The serpentine conductor 36 is positioned above and along the aligned outer casings or walls 26 of similar optical pipes 24 in the honeycomb grid 22, as schematically shown by FIG. 4, in the desired spaced-apart relationship with the adjacent plano-outer surface 34 of the EMI assembly 20 as shown by FIG. 3. This serpentine positioning of the electrical conductor 36 has at least two advantages: first, the electrical conductor does not interfere or obstruct visually discernible information transmitted through the similar optical cores 28; and secondly, good electrical switch contact can be made between a deflected or flexed portion of the flexible sheet 32 with its portion of the continuous electrical conductor 36 an associated outer metal wall 26 at the selected flex site. Stated another way, an operator of the IDT touches the sheet 32 at a selected information or input position and deflects the continuous electrical conductor 36 into electrical contact (i.e., a switch closed position) at the associated outer wall 26 of a respective optical pipe 24 in the honeycomb grid 30 which is at ground potential 30. The conductor 36 is connected to a suitable source of electrical power (not shown, but considered to be conventional; and, preferably a DC power supply) by lead V+. When the conductor 36 is selectively connected to the ground potential as described above, the exact location on the IDT display screen 14 of the thus grounded conductor 36 can be readily determined through measurement of the corresponding electrical resistance using a conventional voltage divider circuit as shown schematically by FIG. 3. Conductor 36 can be considered a resistance element having a resistance $R_2$, while a second resistance $R_1$ is connected in electrical series between lead V+ and a voltage divider measurement test point $V_T$. The resistance of $R_2$ will vary proportionately as the contact point of conductor 36 to ground varies, i.e., the exact location on the IDT display screen 14 where the conductor is selectively connected to the ground potential.

Figure 7:
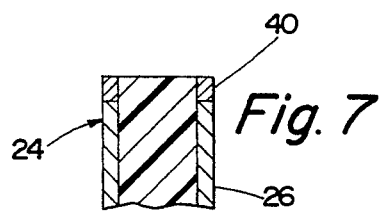
FIG. 7 is a cross section of another optical pipe usable with the EMI assembly of the invention.

It is contemplated that another embodiment of the EMI assembly 20 could have the grid 22 formed from similar optical pipes 24 where the outer casing or wall 26 has a separate outer edge 40 as shown by FIG. 7. This outer edge 40 is formed from a suitable non-glare material, such as a silver-sulfide compound, that is nonetheless a good electrical conductor.

Figure 6:
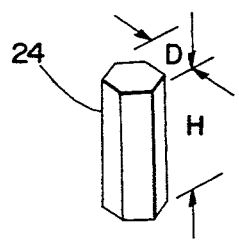
FIG. 6 is a perspective view of the optical pipe of FIGS. 4 and 5.
Figure 9:
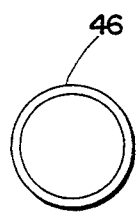
FIG. 9 is a plan view of yet another optical pipe geometry usable with the EMI assembly of the invention.
Figure 8:
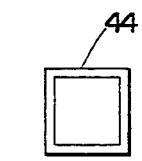
FIG. 8 is a plan view of another optical pipe geometry usable with the EMI assembly of the invention.

It is further contemplated that the optical pipes 24 can have other than the hexagonal cross section as shown particularly by FIGS. 5 and 6. For example, an optical pipe 44 can have a square cross section as shown by FIG. 8, or the substantially circular cross section of another optical pipe 46 as shown by FIG. 9. It is even contemplated the an optical pipe could have an elliptical cross section.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

We claim:

1. In an interactive display terminal having an alphanumeric and graphic display surface which is generally planar, a faceplate for the display surface comprising:
    a) an electrically conductive metal grid having a plurality of grid openings positioned on the display surface permitting a substantially unobstructed planar view of alphanumeric and/or graphic indicia which may be visible at the display surface where each of said openings has a grid outer casing or wall having its longitudinal axis on a geometric center of said grid opening oriented generally perpendicular to the plane of the display surface,
    b) an electrical ground means connected to said electrically conductive metal grid placing said metal grid and its grid opening walls at a common electrical potential,
    c) respective ones of a plurality of optically transparent pipes individually positioned within associated ones of said grid opening walls permitting the planar view at a generally longitudinally extending plane spaced apart from the display surface,
    d) a continuous serpentine electrical conductor aligned off said geometric centers over said grid opening walls spaced apart from said generally longitudinally extending plane and selectively movable into electrical contact with an adjacent portion of said grid wall, and
    e) electrical resistance measurement means responsive to said electrical contact generating an output signal representative of the position of said contact relative to the display surface.

2. The faceplate of claim 1 in which said grid openings define an outwardly extending honeycomb layer positioned on the display surface, 3. The faceplate of claim 1 in which said grid provides radio frequency (rf) attenuation.

4. The faceplate of claim 3 in which each of said electrically conductive grid walls is an electromagnetic radiation waveguide.

5. The faceplate of claim 2 in which said grid openings have a substantially circular cross section in a plane parallel with the display surface.

6. The faceplate of claim 2 in which said grid openings have a noncircular cross section in a plane parallel with the display surface.

7. The faceplate of claim 1 in which said grid walls have an outer edge with an electrically conductive anti-glare surface finish.

8. The faceplate of claim 1 in which said serpentine electrical conductor is carried by a flexible and optically transparent overlay sheet spaced apart from said grid.

9. The faceplate of claim 8 in which said overlay sheet is an interactive surface for the terminal.

10. The faceplate of claim 1 in which said resistance measurement means is a voltage-divider circuit.

11. In an interactive display terminal having an alphanumeric and graphic display surface which is generally planar, a faceplate for the display surface comprising:
    a) a honeycomb electrically conductive grid positioned on the display surface having outwardly extending grid walls that divide the display surface into a plurality of discrete elements,
    b) an electrical ground means connected to said grid placing said grid at a common electrical potential,
    c) optically transparent means positioned at each one of said plurality of discrete elements and bounded by at least said grid wall, said transparent means permitting a view of indicia visible at the display surface along a generally longitudinally extending plane spaced apart from the planar display surface,
    d) a single electrical conductor spaced apart from and superimposed above selected grid walls of said grid plane, said conductor selectively movable into electrical contact with an adjacent and associated grid wall which connects said conductor to said common electrical potential, and
    e) electrical resistance measurement means responsive to each electrical contact and generating a corresponding output signal representative of the position coordinates of said contact relative to the display surface.

12. The faceplate of claim 11 in which said honeycomb grid provides an electromagnetic screen for each of said discrete elements of the display surface.

13. The faceplate of claim 12 in which said electromagnetic screen provides radio frequency (rf) attenuation.

14. The faceplate of claim 11 in which said optical transparent means provides an optical pipe for enhanced viewing of any display surface indicia at said longitudinally extending plane.

15. The faceplate of claim 11 in which said single electrical conductor is serpentine.

* * * * *